US012632924B2

(12) United States Patent
Patel et al.

(10) Patent No.: US 12,632,924 B2
(45) Date of Patent: May 19, 2026

(54) EFFICIENT DEMOSAICING ON NEURAL PROCESSING UNITS

(71) Applicant: QUALCOMM Incorporated, San Diego, CA (US)

(72) Inventors: Shubham Deepak Patel, Gondia (IN); Pawan Aasudaram Budhwani, Amravati (IN); Lakshmi Kantha Reddy Ponnatota, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 18/463,144

(22) Filed: Sep. 7, 2023

(65) Prior Publication Data

US 2025/0086752 A1 Mar. 13, 2025

(51) Int. Cl.
| | |
|---|---|
| *G06T 3/4046* | (2024.01) |
| *G06T 3/4015* | (2024.01) |
| *H04N 23/84* | (2023.01) |
| *H04N 23/11* | (2023.01) |

(52) U.S. Cl.
CPC .......... *G06T 3/4046* (2013.01); *G06T 3/4015* (2013.01); *H04N 23/843* (2023.01); *H04N 23/11* (2023.01)

(58) Field of Classification Search
CPC ..... G06T 3/4015; G06T 3/4046; G06V 10/82; H04N 23/11; H04N 23/843
See application file for complete search history.

(56) References Cited

U.S. PATENT DOCUMENTS

| | | | | |
|---|---|---|---|---|
| 11,954,875 B2 * | 4/2024 | Lin | ................. | G06V 10/26 |
| 12,198,360 B2 * | 1/2025 | Lin | ................. | H04N 23/60 |
| 2021/0125380 A1 * | 4/2021 | Lee | ................. | G06T 3/4046 |
| 2021/0241429 A1 | 8/2021 | Pan et al. | | |
| 2021/0264144 A1 * | 8/2021 | Cho | ................. | G06V 10/454 |
| 2022/0036523 A1 | 2/2022 | Moran et al. | | |
| 2022/0222836 A1 * | 7/2022 | Lin | ................. | G06V 20/188 |
| 2022/0222838 A1 * | 7/2022 | Lin | ................. | G06V 10/25 |
| 2022/0301114 A1 * | 9/2022 | Marras | ................. | G06T 5/70 |
| 2023/0007964 A1 * | 1/2023 | Jang | ................. | H04N 1/6077 |
| 2023/0021444 A1 | 1/2023 | Lim et al. | | |
| 2024/0037732 A1 * | 2/2024 | Gong | ................. | G06T 3/4046 |
| 2025/0005718 A1 * | 1/2025 | Imber | ................. | G06N 3/045 |

(Continued)

OTHER PUBLICATIONS

Brady D., et al., "Smart Cameras", arxiv.org, Cornell University Library, 201 Olin Library Cornell University Ithaca, NY 14853, Feb. 11, 2020, 55 Pages, XP081597787, Section 7.1.

(Continued)

*Primary Examiner* — Antoinette T Spinks
(74) *Attorney, Agent, or Firm* — QUALCOMM Incorporated; Espartaco Diaz Hidalgo

(57) ABSTRACT

Techniques and systems are provided for image demosaicing. For instance a process can include performing a depth-wise convolution operation on image data and a depth-wise convolutional filter with pre-determined parameter values to obtain a plurality of color channels for the image data; performing a convolution operation on the plurality of color channels to obtain a processed plurality of color channels; arranging the processed plurality of color channels into a demosaiced image; and outputting the demosaiced image.

30 Claims, 9 Drawing Sheets

(56)                    References Cited

U.S. PATENT DOCUMENTS

2025/0086752 A1*    3/2025  Patel ................... H04N 23/843
2025/0355364 A1*   11/2025  Fan .................. G03F 7/706841

OTHER PUBLICATIONS

International Search Report and Written Opinion—PCT/US2024/
043917—ISA/EPO—Nov. 28, 2024.
Park B., et al., "Color Filter Array Demosaicking Using Densely
Connected Residual Network", IEEE Access, vol. 7, Sep. 20, 2019,
pp. 128076-128085, XP011746482, Section III.
Ramakrishnan R., et al., "Deep Demosaicing for Edge Implemen-
tation", Advances in Databases and Information Systems, Lecture
Notes in Computer Science, Springer International Publishing,
Cham, Aug. 8, 2019, pp. 275-286, XP047516613, Section 3.
Syu N-S., et al., "Learning Deep Convolutional Networks for
Demosaicing", Computer Vision and Pattern Recognition, Feb. 11,
2018, XP093196644, pp. 1-14, Section III.

* cited by examiner

202

FULLY CONNECTED

204

LOCALLY CONNECTED

210

212

214

216

206

CONVOLUTIONAL

208

EFFICIENT DEMOSAICING ON NEURAL PROCESSING UNITS

FIELD

The present application is related to image processing. For example, aspects of the present application relate to systems and techniques for efficient demosaicing on processing units (e.g., neural processing units (NPUs)).

BACKGROUND

Many devices and systems allow a scene to be captured by generating images (or frames) and/or video data (including multiple frames). For example, a camera or a device including a camera (or cameras) can capture a sequence of frames of a scene (e.g., a video of a scene) based on light entering the camera. To enhance a quality of frames captured by the camera, the camera may include lenses to focus light entering the camera. The sequence of frames captured by the camera can be output for display, can be output for processing and/or consumption by other devices, among other uses.

Cameras may often include one or more processors, such as image signal processors (ISPs), that can process one or more image frames captured by an image sensor. For example, a raw image frame captured by an image sensor can be processed by an image signal processor (ISP) to generate a final image. Cameras can be configured with a variety of image capture and image processing settings to alter the appearance of an image. Some camera settings are determined and applied before or while an image is captured, such as ISO, exposure time (also referred to as exposure duration), aperture size, f/stop, shutter speed, focus, and gain, among others. Increasingly image processing tasks that are performed before or while images are captures are being performed using artificial intelligence (AI)/machine learning (ML) models.

SUMMARY

Systems and techniques are described herein for image processing. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, apparatuses, methods and computer-readable media for image processing are provided. In one illustrative example, an apparatus for image demosaicing is provided. The apparatus includes at least one memory configured to store image data and at least one processor coupled to the at least one memory. The at least one processor is configured to: perform a depth-wise convolution operation on the image data and a depth-wise convolutional filter with pre-determined parameter values to obtain a plurality of color channels for the image data; perform a convolution operation on the plurality of color channels to obtain a processed plurality of color channels; arrange the processed plurality of color channels into a demosaiced image; and output the demosaiced image.

As another example, a method for image demosaicing is provided. The method includes: performing a depth-wise convolution operation on image data and a depth-wise convolutional filter with pre-determined parameter values to obtain a plurality of color channels for the image data; performing a convolution operation on the plurality of color channels to obtain a processed plurality of color channels; arranging the processed plurality of color channels into a demosaiced image; and outputting the demosaiced image.

In another example, a non-transitory computer-readable medium is provided that includes stored thereon instructions, which when executed by at least one processor, cause the at least one processor to: perform a depth-wise convolution operation on image data and a depth-wise convolutional filter with pre-determined parameter values to obtain a plurality of color channels for the image data; perform a convolution operation on the plurality of color channels to obtain a processed plurality of color channels; and arrange the processed plurality of color channels into a demosaiced image; and output the demosaiced image As another example, an apparatus for image demosaicing is provided. The apparatus includes: means for performing a depth-wise convolution operation on image data and a depth-wise convolutional filter with pre-determined parameter values to obtain a plurality of color channels for the image data; means for performing a convolution operation on the plurality of color channels to obtain a processed plurality of color channels; means for arranging the processed plurality of color channels into a demosaiced image; and means for outputting the demosaiced image In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
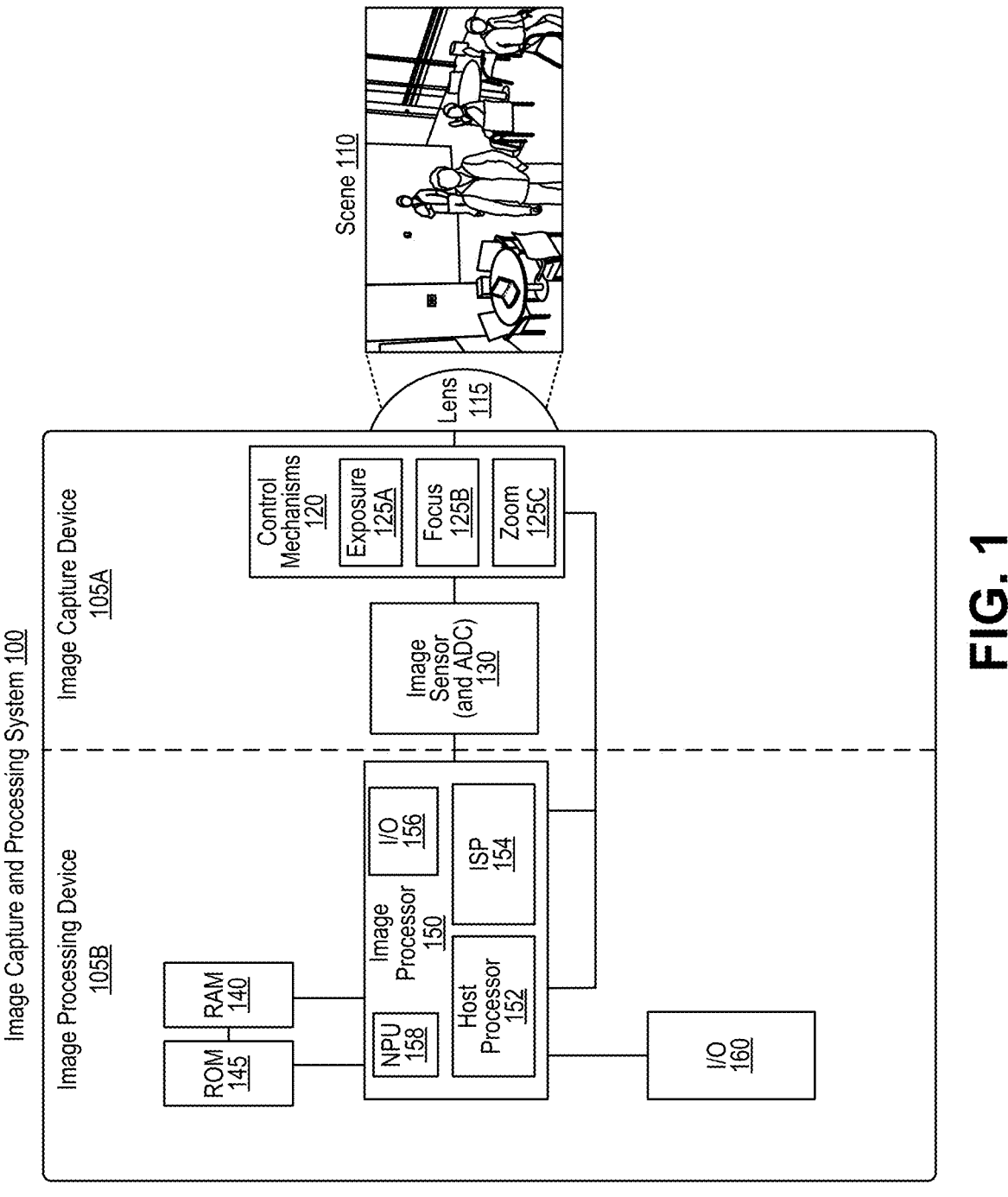
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

In some cases, a machine learning (ML) model, such as a convolutional neural network (CNN) may be used to process raw image data. Raw image data may be unprocessed data captured by an image sensor. In some cases, raw image data is often captured using a color filter array such as a Bayer color filter (e.g., Bayer filter). The raw image data captured by an image sensor using a Bayer filter may have, for a grid of four pixels (e.g., a 2×2 matrix), two pixels having pixel values for green data, one pixel having a pixel value for red data, and one pixel having a pixel value for blue data. In some cases, the raw image data may be processed, at least in part, by demosaicing. Demosaicing reconstructs a full color image from the raw image data so that each pixel includes red, green, and blue data. In some cases, ML systems may be used to perform demosaicing.

In some cases, ML systems may execute on a neural processing unit (NPU). In some cases, ML systems may perform convolution operations and an NPU may include multiply and accumulate (MAC) units to accelerate performance of convolution operations. However, existing ML-based demosaicing techniques tend to include numerous memory intensive operations and relatively few convolutional operations, that, when executed on some NPUs, can inefficiently utilize the MAC units of the NPU and waste NPU cycles. As NPUs are generally not optimized to perform memory intensive operations, existing ML-based demosaicing techniques tend to run relatively poorly on NPUs as compared to CPUs/GPUs. In some cases, it may be useful to provide a technique for efficient demosaicing on NPUs using ML algorithms.

Systems, apparatuses, electronic devices, methods (also referred to as processes), and computer-readable media (collectively referred to herein as "systems and techniques") are described herein for efficient demosaicing on NPUs. As an example, image data, such as raw image data, may be received and a depth-wise convolution operation may be performed on the image data. This depth-wise convolution operation may use depth-wise convolutional filter with predetermined parameter values. The predetermined parameter values may be predetermined based on a color filter of an image sensor used to capture the image data. The predetermined parameter values may be determined to extract pixel color values from the image. The depth-wise convolution operation may extract the pixel color values to produce a set of concatenated color channel, such as a red color channel, blue color channel, and green color channel. The color channels may be passed to a convolution operation block. The convolution operation block may use one or more convolution layers to perform an interpolation operation on the concatenated color channels. The interpolated color channels may then be arranged into color channels of a processed image for output by a depth-to-space block. In some cases, the depth-wise convolutional filter operation, convolution operation, and depth-to space operation may be executed on MAC units of the NPU.

Various aspects of the application will be described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), cyan, yellow, green, magenta (CYGM filter), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 7:
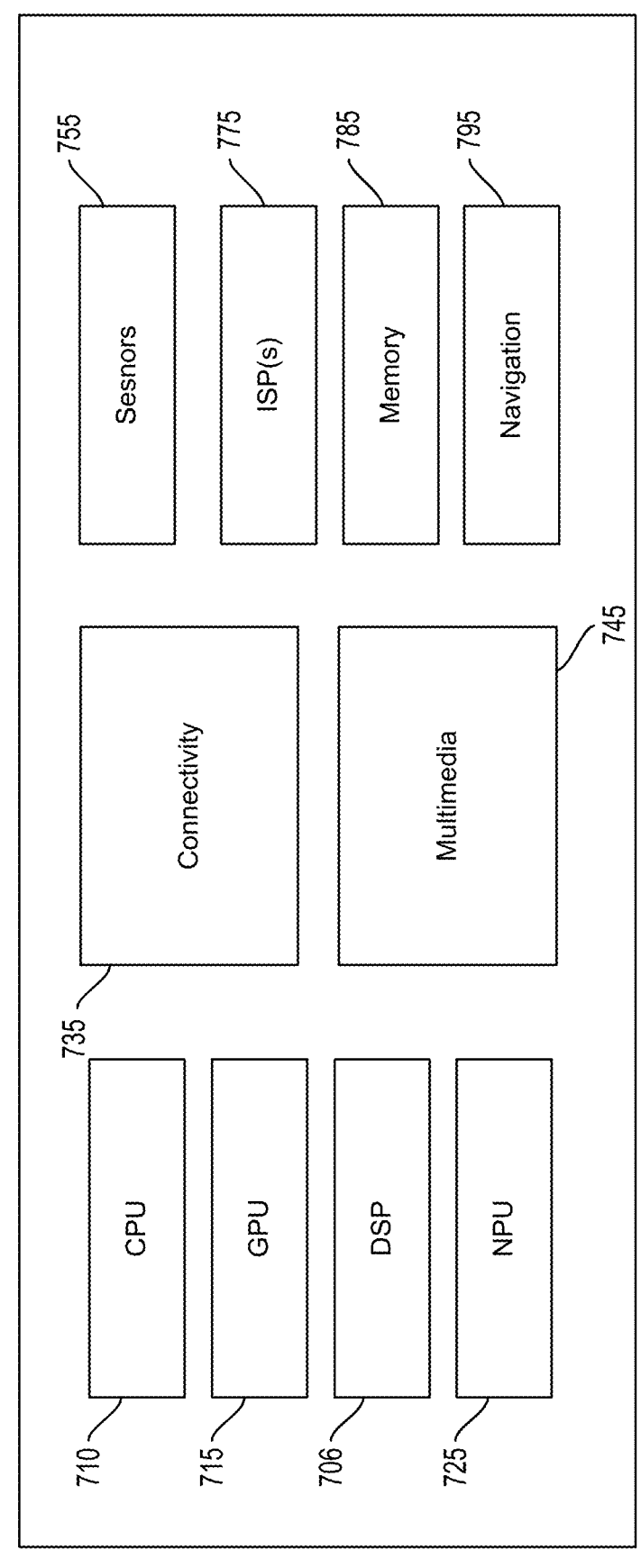
FIG. 7 illustrates an example implementation of a system-on-a-chip (SOC), in accordance with aspects of the present disclosure.

The image processor 150 may include one or more processors, such as one or more image signal processors (ISPs) (including ISP 154), one or more host processors (including host processor 152), a neural processing unit (NPU) 158, and/or one or more of any other type of processor 710 discussed with respect to the computing system 700 of FIG. 7. The host processor 152 can be a digital signal processor (DSP) and/or other type of processor. In some implementations, the image processor 150 is a single integrated circuit or chip (e.g., referred to as a system-on-chip or SoC) that includes the host processor 152, NPU 158, and the ISP 154. The NPU may include, among other circuitry, an input buffer, a weight buffer, a set of multiply and accumulate units, and an output buffer (not shown) and the NPU may be optimized to perform convolution calculations that are often found in ML models such as convolutional neural network, deep convolutional networks, etc. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154, the host processor 152, and the NPU 158), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some cases, images captured by the image capture and processing system 100 may be processed by neural networks and/or machine learning (ML) systems. A neural network is an example of an ML system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 2A-FIG. 3.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
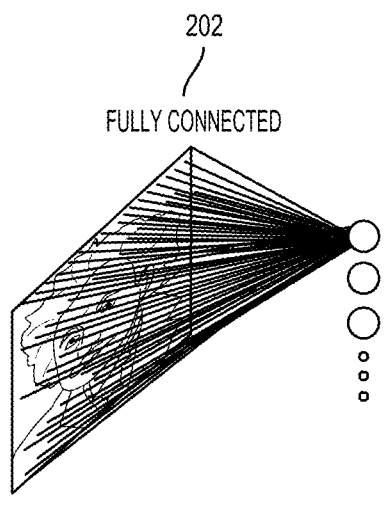
FIG. 2A is a diagram illustrating an example of a fully-connected neural network, in accordance with some examples of the present disclosure.
Figure 2B:
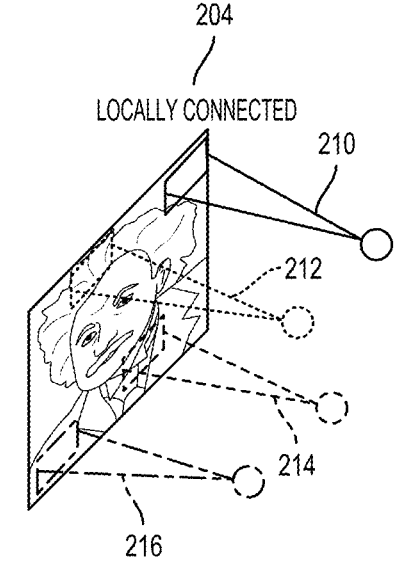
FIG. 2B is a diagram illustrating an example of a locally-connected neural network, in accordance with some examples of the present disclosure.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
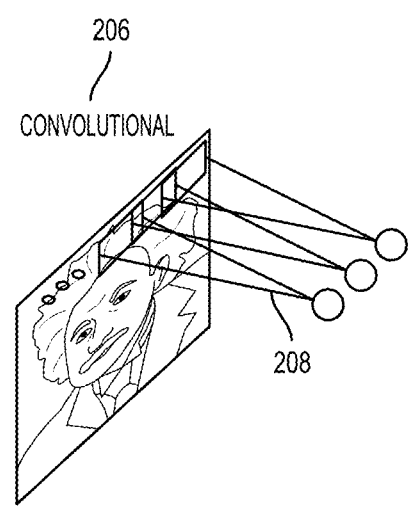
FIG. 2C is a diagram illustrating an example of a convolutional neural network, in accordance with some examples of the present disclosure.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
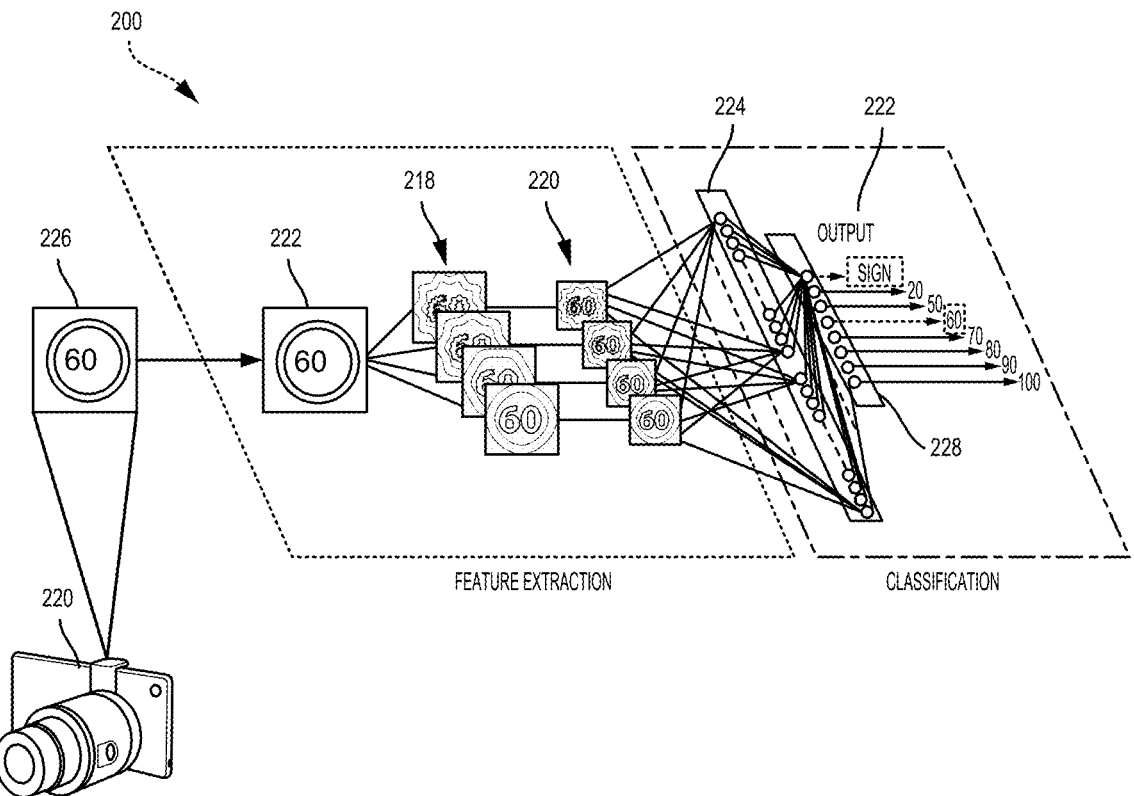
FIG. 2D is a diagram illustrating an example of a deep convolutional network (DCN) for recognizing visual features from an image, in accordance with some examples of the present disclosure.

One type of convolutional neural network is a deep convolutional network (DCN). FIG. 2D illustrates a detailed example of a DCN 200 designed to recognize visual features from an image 226 input from an image capturing device 230, such as a image capture and processing system 100 of FIG. 1. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
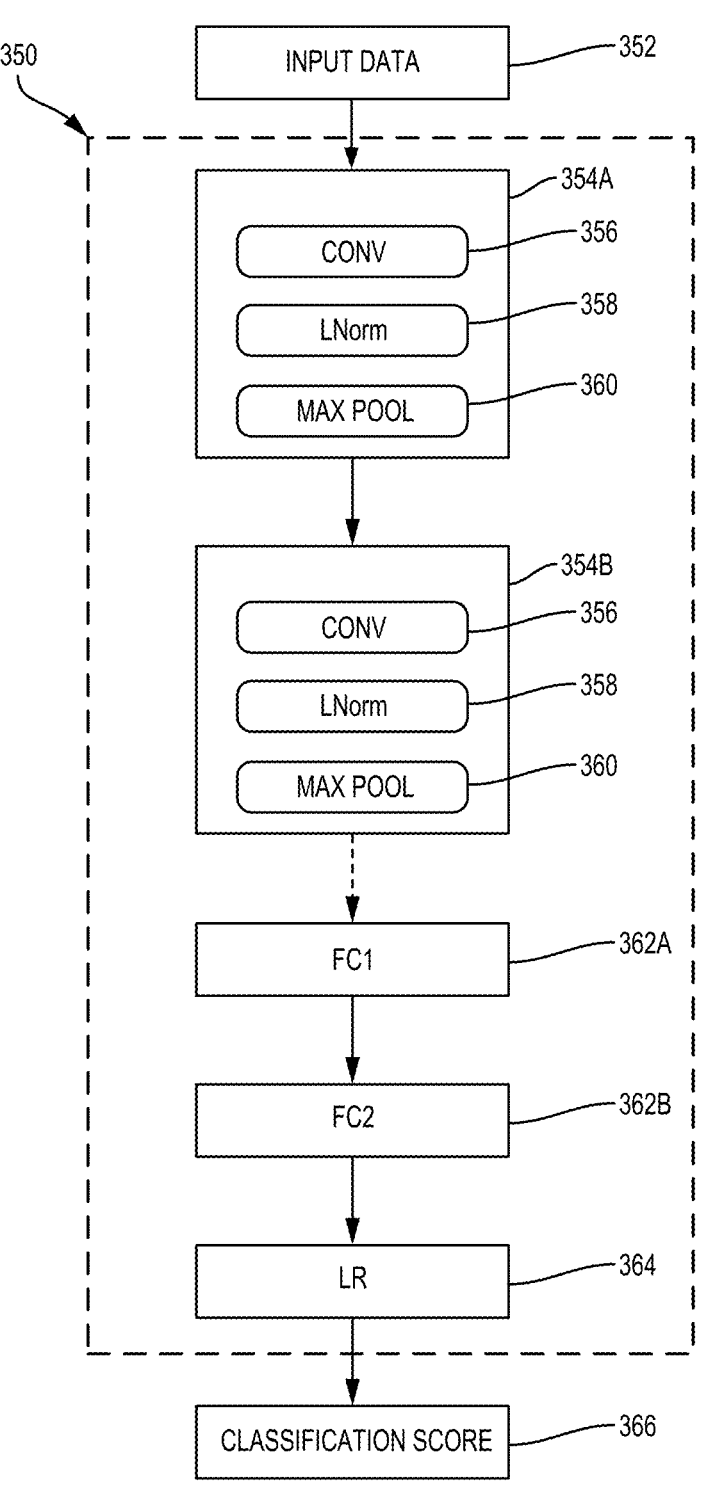
FIG. 3 is a block diagram illustrating an example deep convolutional network (DCN), in accordance with some examples of the present disclosure.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B May be configured with a convolution layer (CONV) 356, a normalization layer (LNorm) 358, and a max pooling layer (MAX POOL) 360. Of note, the layers illustrated with respect to convolution blocks 354A and 354B are examples of layers that may be included in a convolution layer and are not intended to be limiting and other types of layers (as well as an additional number of layers) may be included in any order.

The convolution layers 356 may include one or more convolution filters, which may be applied to the input data 352 to generate a feature map. Although only two convolution blocks 354A, 354B are shown, the present disclosure is not so limiting, and instead, any number of convolution blocks (e.g., convolution blocks 354A, 354B) may be included in the deep convolutional network 350 according to design preference. The normalization layer 358 may normalize the output of the convolutional filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a processor such as a CPU or GPU, or any other type of processor 1010 discussed with respect to the computing system 1000 of FIG. 10 to achieve high performance and low power consumption. In alternative aspects, the parallel filter banks may be loaded on a DSP or an ISP of the computing system 1000 of FIG. 10. In addition, the deep convolutional network 350 may access other processing blocks that may be present on the computing system 1000 of FIG. 10, such as sensor processor and navigation module, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362A, 362B, 364 of the deep convolutional network 350 are weights (not shown) that are to be updated. The output of each of the layers (e.g., 356, 358, 360, 362A, 362B, 364) may serve as an input of a succeeding one of the layers (e.g., 356, 358, 360, 362A, 362B, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

In some cases, one or more convolutional networks, such as a DCN, may be incorporated into more complex ML networks. As an example, as indicated above, the deep convolutional network 350 may output probabilities that an input data, such as an image, includes certain features. The deep convolutional network 350 may then be modified to extract (e.g., output) certain features. Additionally, DCNs may be added to extract other features as well. This set of DCNs may function as feature extractors to identify features in an image. In some cases, feature extractors may be used as a backbone for additionally ML network components to perform further operations.

In some cases, ML networks may be applied to raw image data. Raw image data may be unprocessed data captured by an image sensor. In digital imaging, raw image data is often captured using a color filter array such as a Bayer color filter (e.g., Bayer filter). The color filter arrays include color filters placed over pixels of the image sensor such that each pixel detects wavelengths corresponding to certain colors and provides image data for that color. The color filters may be arranged in a pixel pattern, such as a Bayer pattern with one blue pixel, one red pixel, and two green pixels arranged in a 2×2 pixel matrix. Thus, in the raw image data for an image sensor using a Bayer filter, for a grid of four pixels (e.g., a 2×2 matrix), two pixels will include only green data, one pixel will include only red data, and one pixel will include only blue data.

In many cases, the raw image data may be processed to generate a processed image for output. As a part of the processing, the raw image data may be demosaiced. Demosaicing reconstructs a full color image from the raw image data so that each pixel includes red, green, and blue data. In some cases, the demosaicing may be performed by an image signal processor (ISP) that is coupled to the image sensor. The ISP may also perform various other processing functions to improve the raw image data, such as noise reduction, white balancing, contrast enhancement, and the like. This additional processing may be performed prior to or after demosaicing. In some cases, ML systems may be used to perform demosaicing and/or additional processing that may be performed for raw image data.

Figure 4:
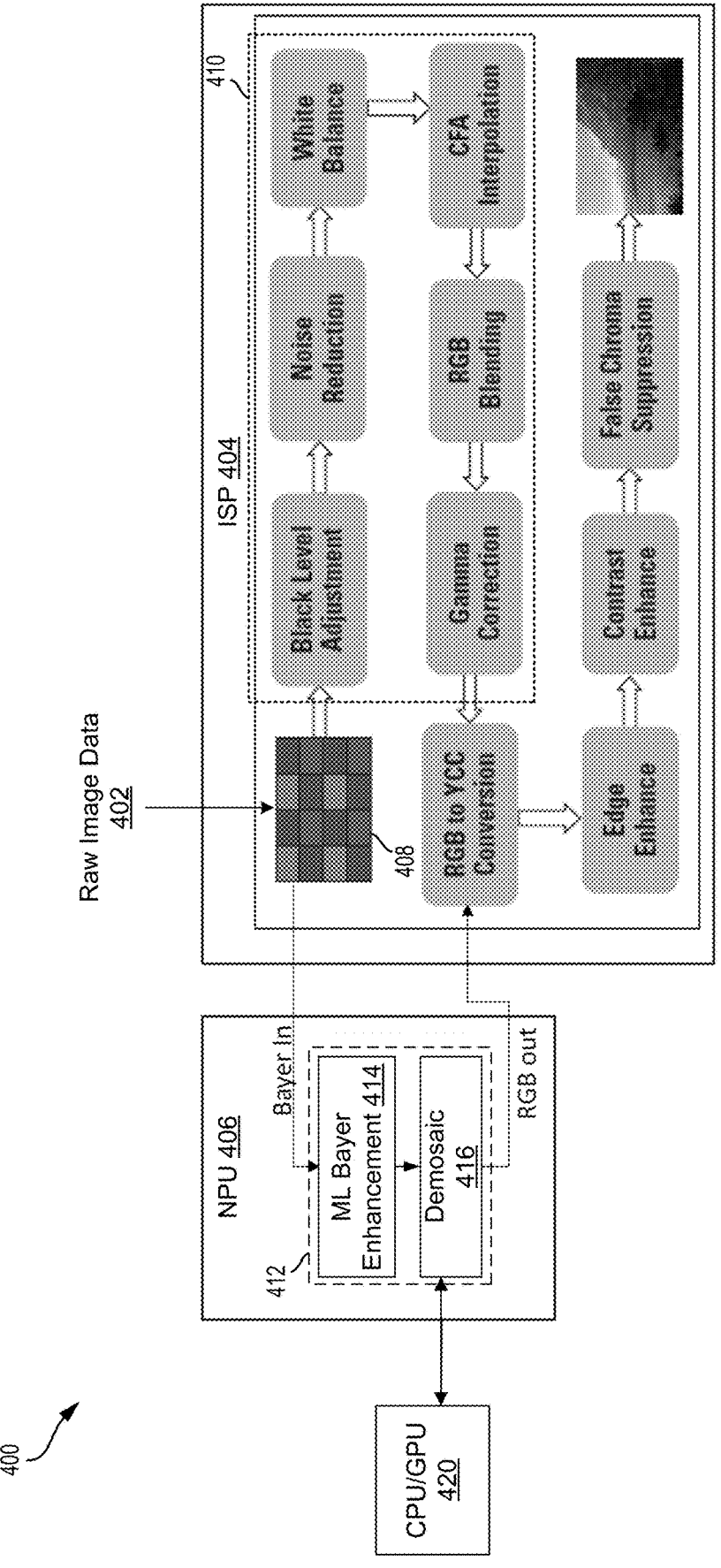
FIG. 4 is a block diagram illustrating an image processing pipeline for processing images, in accordance with aspects of the present disclosure.

FIG. 4 is a block diagram illustrating an image processing pipeline 400 for processing images, in accordance with aspects of the present disclosure. In image processing pipeline 400, image data 402, for example from an image sensor, may be input to an ISP 404. In this example, the image data 402 is raw image data in a Bayer pattern format 408. In other cases, the ISP 404 may process other types of image data, such as image data obtained with different color filters. In some cases, the ISP 404 may be configured to process the image data 402 using a traditional Bayer enhancement and demosaicing pipeline 410 (e.g., with black level adjustment blocks, noise reduction blocks, white balance blocks, interpolation, etc.). In other cases, the ISP 404 may be configured to process the image data 402 using a ML based Bayer enhancement and demosaicing pipeline 412. In this example, the ML based Bayer enhancement and demosaicing pipeline 412 includes one or more ML models for Bayer enhancements 414 as well as a ML model for demosaicing 416. In some cases, one or more ML models of the Bayer enhancement and demosaicing pipeline 412 may be executed on an NPU 406. Output from the traditional Bayer enhancement and demosaicing pipeline 410 and/or ML based Bayer enhancement and demosaicing pipeline 412 may be further processed to convert the image from RGB to YCC format, enhance edges and contrast, etc.

Efficiently performing demosaicing on an NPU may be challenging as a common demosaic operation includes extracting (e.g., separating) the red, green, and blue pixels from the input Bayer pattern image into separate images, padding and interpolating to fill out the blank pixels in the extracted pixels, and then concatenating the images into a single output image with red, green, and blue pixel values for each pixel. In some cases, existing ML-based techniques for demosaicing may not perform very well when executed on a NPU 406 when applied to relatively large images, such as 4K+ images. For example, an NPU 406 may include a relatively large number of multiply and accumulate (MAC) hardware units optimized accelerate convolution based operations. Such operations may compute a product of two values (e.g., numbers, vectors, matrices, etc.) and stores the result in an accumulator, such as a register, and the result may then be fed back through the MAC. However, an existing ML-based demosaicing technique includes relatively few operations utilizing the MAC hardware units and numerous memory intensive operations, such as extraction/ slicing, padding, and concatenation operations. Many NPUs may not be optimized to perform memory intensive operations, such as extracting certain portions of data in a nonlinear pattern (e.g., such as a certain color information), padding the data (e.g., interpolating), concatenating the data, and so forth, where data in the accumulators/registers/cache/ on-chip memory/etc. of the NPU 406 are being heavily written into and/or read from. Thus, in many cases, existing ML-based techniques for demosaicing may perform better on a CPU or GPU 420 instead of the NPU 406 as the CPU/GPU 420 may be better optimized for memory intensive operations, even if the CPU/GPU 420 may not be as performant for MAC operations. In some cases, a technique for ML-based demosaicing that minimizes memory intensive operations to help improve performance of be ML-based demosaicing on MAC hardware units of an NPU 406 may be useful.

Figure 5:
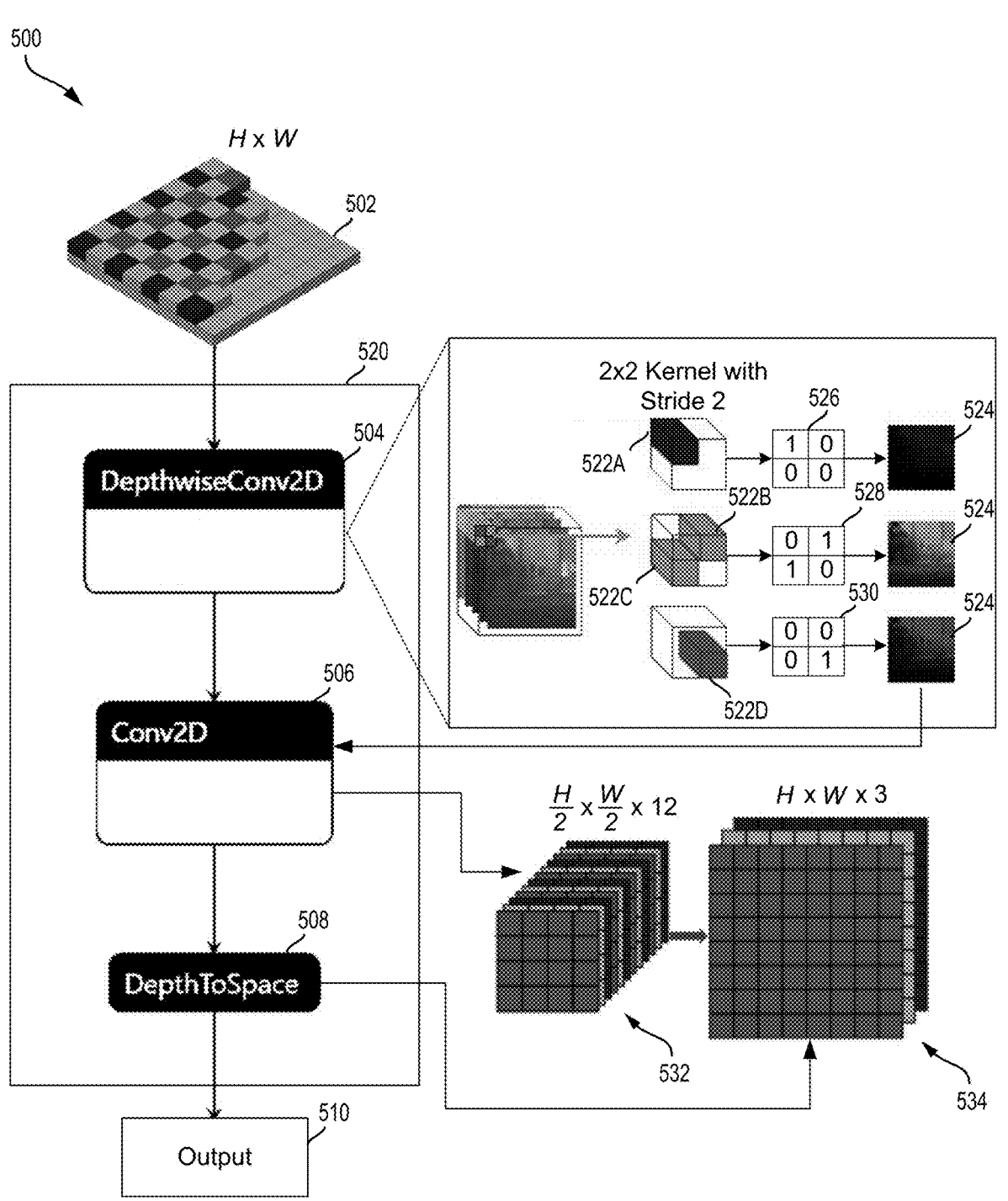
FIG. 5 is a computational graph illustrating a technique 500 for efficient demosaicing on a NPU, in accordance with aspect of the present disclosure.

FIG. 5 is a computational graph illustrating a technique 500 for efficient demosaicing on a NPU, in accordance with aspect of the present disclosure. In this example, a ML model for demosaicing 520 may include a depth-wise convolution block 504, a convolution block 506, and a depth-to-space block 508. In technique 500, a Bayer pattern input image 502 may be input to depth-wise convolution block 504 of the ML model for demosaicing 520 to obtain a set of color channel images (e.g., an image including just the red values, an image including just the green values, and an image including just the blue values). Of note, while discussed in the context of a Bayer pattern input image 502, it may be understood that technique 500 may be applied to any patterned input image. In some cases, the input image 502 may be in a single channel with one color value per pixel. The depth-wise convolution block 504 may perform a depth-wise convolution on one or more portions on the input image 502. In cases where a single portion is used and the input image 502 is a Bayer pattern image, three color channels may be output: one red, one green, and one blue color channel.

In some cases, the input image may be divided into a number of portions. Each portion may be input to the ML model for demosaicing 520 as a separate channel. For example, an image may be divided into eight (8) portions and input to the depth-wise convolution block 504 as 8 batches (e.g., 8 channels). Each batch may run concurrently and independently of the other batches (e.g., each batch can be thought of as a separate image). For understanding and clarity the depth-wise convolution block 504 will be discussed in the context of a single batch and concepts and techniques discussed with respect to the batch may apply to other batches.

In some cases, a depth-wise convolution block 504 may take an input, such as input image 502 and performs separate convolution operations with each filter of a set of filters to generate a separate output channel corresponding to each filter. As an example, using a 2×2 kernel size and stride 2, a 2×2 pixel portion of the input image may be selected and the selected pixel portion may be convolved with each filter of a set of filters. In some cases, the filters of the set of filters may be predetermined. The filters of this depth-wise convolution are fixed and not trainable (e.g., where the filter is predefined and not changed during training of the ML model). In some cases, the depth-wise convolution block 504 may be replaced with one or more convolution blocks configured to perform a depth-wise convolution (e.g., convolve the pixel values of the input image 502 with each filter and produce a color channel corresponding with each filter). In some cases, the depth-wise convolution may be performed using a single software instruction while a convolution based version may using multiple (or nested) software instructions.

Filter values (e.g., pre-determined parameter values) of the set of filters may be determined to allow MAC units of a NPU to extract pixel color values from the input image 502 and may be based on the pixel pattern of the input image. As an example, for a 2×2 pixel portion of a Bayer pattern image, an upper left pixel may be a blue pixel value 522A, an upper right pixel may be a green pixel value 522B, a lower left pixel may be a green pixel value 522C, and a lower right pixel may be a red pixel value 522D. For such a 2×2 pixel portion, the first filter 526 may be [[[[1.0]], [[0.0]]], [[[0.0]], [[0.0]]]], the second filter 528 may be [[[[0.0]], [[0.0]]], [[[0.0]], [[1.0]]]]], and the third filter 530 may be [[[[0.0]], [[1.0]]], [[[1.0], [[0.0]]]]]. The first filter, as applied to the 2×2 pixel portion, would multiply the blue pixel value by 1 and multiply all the other color pixel values by 0, leaving the blue pixel value and zeroing out (e.g., effectively removing) the other color values for output on a blue channel. Applying the second filter to the 2×2 pixel portion would multiply the green pixel values by 1 and zero out the other color pixel values, leaving the green pixel values for output on a green channel. Similarly, applying the third filter to the 2×2 pixel portion would multiply the red pixel value by 1 and zero out the other color pixel values, leaving the red pixel values for output on a red channel. In some cases, values of the filters to be applied may be determined based on a pixel pattern of an input image data (e.g., of the image sensor) is expected to have (e.g., BGGR, RGGB, etc.) and these values may be predefined based on the expected pixel pattern. In some cases, the values of the filter may be determined based on the expected pixel pattern of an image sensor used to capture image data. In some cases, multiple filter values may be determined for an image sensor, for example, if the image sensor is configured to capture image data with different pixel patterns based on an image capture mode and/or setting.

In some cases, the depth-wise convolution of the 2×2 pixel portion may be performed on MAC units of an NPU. For example, the filters may be stored in a weight buffer of the NPU, and the pixel portions may be stored in an input buffer of the NPU. Both the filter and pixel portions may be fed into the MAC for processing as a simple multiplication operation, and the output stored on accumulators of the MAC in separate channels. A next 2×2 pixel portion of the input image 502 (e.g., stride 2) may then be processed using the depth-wise convolution block 504 and NPU in a substantially similar manner. In some cases, applying a filter to a pixel portion may be performed in one cycle of the NPU. In some cases, using 1 and 0 as the only values in the filter may help allow the respective color value to be extracted from the 2×2 pixel portion by the MAC units of an NPU without activating the full MAC circuit as certain patterns of discrete zeros and ones may help reduce energy consumption for both multiply and memory operations for certain NPUs. The exact pattern of discrete zeros and ones may be hardware dependent. Additionally, filter weights of 0 to 1 remain in a 1-bit quantization range and are thus quantization friendly, helping to reduce ML model size and thus energy used to execute the model for a given accuracy level. In some cases, the pixel portion (e.g., kernel) may be any size and multiple pixel portions may be processed in parallel. Output of the depth-wise convolution block 504 may be one concatenated color channel (e.g., image) for each input color. Thus, for RGB, three color channels 524 may be output. In some cases, for an input resolution (H×W) of the input image, a resolution of the concatenated color channels may be H/2×W/2. Of note, while discussed with respect to a NPU including MAC units, it should be understood that the techniques discussed herein may be applicable to any processor including MAC units. For example, a CPU and/or GPU may include MAC units and the techniques discussed herein may be applicable to such a CPU and/or GPU. As another example, the NPU may be implemented as an ASIC including the MAC units and ML models for performing the techniques discussed herein. Additionally, the NPU may be integrated into an image sensor, in some examples.

In cases where the input image 502 is divided into multiple batches, as each batch can run concurrently and independently of the other batches, a set of concatenated color channels based on the pixel pattern may be output per batch. For example, for a Bayer pattern input image with 8 batches, 3 concatenated color channels are output for each batch.

The output concatenated color channels from the depth-wise convolution block 504 may be input to a convolution block 506. The convolution block 506 may include one or more ML layers performing one or more convolution operations. The convolution block 506 may perform an interpolation operation on the concatenated color channels output by the depth-wise convolution block 504. In some cases, the convolution block 506 may also perform other operations, such as color correction, white balance, edge sharpening, etc. In some cases, the convolution block 506 may interpolate the color channels input from the depth-wise convolution block 504 to output color channels 534 having a same size as the input image 502. The output color channels 534 may thus be a same resolution (shown as H×W) as the input image 502.

In some aspects, the convolution block 506 may predict (e.g., interpolate) additional color values using 3×3 receptive attention across channels (e.g., across the color channels, such as the red, green, and blue channels). In some cases, the convolution block 506 may be configured to output multiple channels per input channel. In some cases, the number of output channels per input concatenated color channels may be based on how much upscaling is to be performed. In some cases, the number of filters and output channels of the convolution block 506 may be determined as a function of a height upscale factor*width upscale factor*a number of desired output channels. For example, as discussed above, the resolution of the concatenated color channels may be H/2×W/2. In such an example, the height upscale factor may be 2 and the width upscale factor may also be 2 (e.g., to provide an output of the original resolution H×W), and a number of desired output channels in an output image is 3 (e.g., R, G, B), so 2*2*3=12 channels (shown as channels 532) may be output by the convolution block 506. In some cases, the convolution block 506 may be configured to generate 12 channels of output by configuring a convolution operation of the convolution block 506 with 12 convolution filters with trainable weights.

The convolution block 506 may be trainable to perform the interpolation operation. As indicated above, the depth-wise convolution block 504 may not be trainable. Additionally, the depth-to-space block 508 may also not be trainable. The convolution block 506 may be trainable to perform the interpolation operation. In some cases, a dataset for training the ML model for demosaicing 520 may be obtained by obtaining a large number of images in an output format, such as RGB, and processing the images to convert the images into an input format, such as an image with a Bayer pattern. This processing may be performed, for example, by removing all but one color value per pixel (e.g., leaving just one of either the red value, green value, or blue value per pixel) based on the input format (e.g., Bayer pattern, quad Bayer, CMYW, etc.). For example, an image may be converted to a Bayer pattern image. The Bayer pattern image and the original image pair may be used to train the convolution block 506 of the ML model for demosaicing 520. For example, the original image may be used as the ground truth and the corresponding Bayer patter image may be input to the ML model for demosaicing 520 during training. During training, the depth-wise convolution block 504 and depth-to-space block 508 may operate in the same way as during inference. The convolution block 506 may attempt to perform the interpolation operation and the output results may be compared to the original image to calculate a loss function for adjusting weights of the convolution block 506. Weights of the depth-wise convolution block 504 and depth-to-space block 508 are not adjusted.

In some cases, the operations performed by the convolution block 506 may be performed on MAC units of an NPU. As discussed above, the MAC units of the NPU may be optimized to accelerate convolution-based operations and the operations of the convolution block 506 may take advantage of such optimizations when executing on the MAC units of the NPU.

In some cases, the output color channels of the convolution block 506 may be input to a depth-to-space block 508. The depth-to-space block 508 rearranges data from the depth dimension into block(s) of spatial dimension data. For example, the color channels may be treated as the depth dimension and the depth-to-space block 508 may perform a series of pointer manipulations (e.g., adjustments to memory offset values) to obtain a processed image (e.g., demosaiced image, RGB color image, full color image, etc.) for output 510. For example, as indicated above, the convolution block 506 may output multiple output channels per input channel (e.g., based on a number of color channels for the pixel pattern of the input image 502) and the depth-to-space block 508 may arrange (e.g., merge, rearrange) the multiple output channels to obtain the same number of channels as the input channels. As a more specific example, the convolution block 506 may output 12 channels for three channels input (e.g., color channels based on the Bater pattern input image), and the depth-to-space block 508 may arrange the 12 channels back into 3 channels. In some cases, this may be performed by adjusting offset values for locating a next value for a color channels (e.g., after reading x number of red color channel values, a next red color channel value may be located at y). In some cases, the NPU may be used to recalculate these offset values. In some cases, the depth-to-space block 508 may not be trainable.

In some cases, the convolution block 506 and depth-to-space block 508 pair may be replaced by a convolution block 506 and transpose convolution block pair (not shown). Where the convolutional block 506 and the transpose convolution block demosaic and up-sample the concatenated color channels output from the depth-wise convolution block 504. The transpose convolution block may include one or more layers that perform a transpose convolution operation. The transpose convolution operation essentially reverses an operation of a convolution operation by dimensions. In some cases, a number of output channels for the convolution block 506 may be also be adjusted. In some cases, the transpose convolution operation may be trainable.

In some cases, the convolution block 506 may be replaced by a bilinear resize operation and the depth-to-space block 508 may be replaced by a convolution block (not shown). The bilinear resize operation may interpolate output from the depth-wise convolution block 504 and may be performed iteratively (e.g., not implemented using ML). The convolution block may be trainable and may further filter the output of the bilinear resize operation to perform the mosaic operation.

Figure 6:
FIG. 6 is a flow diagram illustrating a process for demosaicing image data, in accordance with aspects of the present disclosure.
Figure 6:
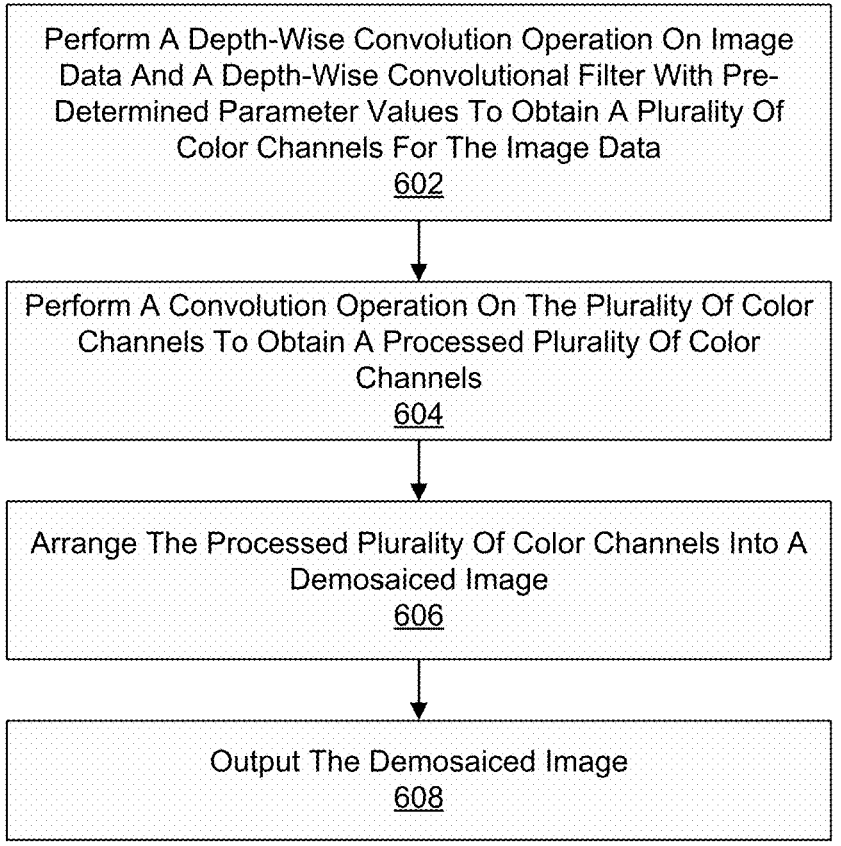

FIG. 6 is a flow diagram illustrating a process 600 for demosaicing image data, in accordance with aspects of the present disclosure. The process 600 may be performed by a computing device (or apparatus) or a component (e.g., a chipset, codec, etc.) of the computing device, such as image capturing and processing system 100 of FIG. 1. The computing device may be a mobile device (e.g., a mobile phone), a network-connected wearable such as a watch, an extended reality (XR) device such as a virtual reality (VR) device or augmented reality (AR) device, a vehicle or component or system of a vehicle, drone, flying object, or other type of computing device. The operations of the process 600 may be implemented as software components that are executed and run on one or more processors (e.g., the image processor 150 of FIG. 1, the host processor 152 of FIG. 1, NPU 158 of FIG. 1, processor 810 of FIG. 8, any combination thereof, and/or other processor(s)). In some cases, the operations of the process 600 can be implemented by a system having a SoC, such as SoC 705 of FIG. 7, and/or a system having the architecture of computing system 800 of FIG. 8.

At block 602, the computing device (or component thereof) may perform a depth-wise convolution operation on image data and a depth-wise convolutional filter with pre-determined parameter values to obtain a plurality of color channels for the image data. For example, a depth-wise convolution block (e.g., depth-wise convolution block 504 of FIG. 5) of a ML model may perform a depth-wise convolution on image data. In some cases, the image data is raw image data. For example, the raw image data may unprocessed data be obtained from an image sensor. In some cases, the raw image data includes a Bayer pattern (e.g., R, G, G, B). In some cases, the depth-wise convolution operation is performed using at least one depth-wise convolutional filter including pre-determined parameter values. For example, the pre-determined parameter values may be pre-determined during a research and development and/or manufacturing process. In some cases, the pre-determined parameter values of the at least one depth-wise convolutional filter for the depth-wise convolution operation are pre-determined based on a color filter of an image sensor used to capture the image data. In some cases, the pre-determined parameter values of the at least one depth-wise convolutional filter are set to 0 or 1. Using 1 and 0 as the only values in the filter may help efficiently extract color values from the image data while reducing energy consumption for the MAC units. In some examples, multiple sets of pre-determined parameter values may be pre-determined for an image sensor. In some cases, the pre-determined parameter values of the at least one depth-wise convolutional filter are determined to extract pixel color values from the image data. In some cases, the color filter is based on a Bayer pattern, and wherein the at least one depth-wise convolutional filter includes a kernel size of 2×2 and a stride of 2. In some cases, the depth-wise convolution operation is performed by a machine learning model for image demosaicing.

At block 604, the computing device (or component thereof) may perform a convolution operation on the plurality of color channels to obtain a processed plurality of color channels. For example, the ML model may include one or more convolutional blocks (e.g., convolution block 506 of FIG. 5) to perform the convolution operation. In some cases, the convolution operation is performed using a plurality of convolutional filters, wherein parameters of the plurality of convolutional filters are tuned based on a training process. In some cases, a number of the plurality of convolutional filters is determined based on at least an upscaling factor. For example, the upscaling factor may be used to upscale a concatenated color channel to an original resolution of the image data. In some cases, the depth-wise convolution operation and the convolution operation are performed on multiply and accumulate hardware units. In some cases, the multiply and accumulate hardware units are included in a neural processing unit, graphics processing unit and/or central processing unit. In some cases, the machine learning model is configured to perform the depth-wise convolution operation, the convolution operation, and arrange the processed plurality of color channels into the demosaiced image on the GPU or CPU. In some examples, the neural processing unit comprises an application specific integrated circuit (ASIC), and wherein the ASIC incorporates a machine learning model configured to perform the depth-wise convolution operation, the convolution operation, and arrange the processed plurality of color channels into the demosaiced image. In some cases, the NPU may be integrated into an image sensor.

At block 606, the computing device (or component thereof) may arrange the processed plurality of color channels into a demosaiced image. For example, one or more layers of the ML model may arrange (e.g., merge, rearrange) the multiple output channels to obtain the same number of channels as the input channels. In some cases, the processed plurality of color channels are arranged into RGB channels by performing a depth to space operation (e.g., by depth-to-space block 508 of FIG. 5). In some examples, the depth to space operation includes spatially arranging data blocks of the processed plurality of color channels to generate the demosaiced image. In some cases, the processed plurality of color channels are up-sampled by performing a transpose convolution operation.

At block 608, the computing device (or component thereof) may output the demosaiced image.

FIG. 7 illustrates an example implementation of a system-on-a-chip (SOC) 705, which may include a central processing unit (CPU) 710 or a multi-core CPU, configured to perform one or more of the functions described herein. In some cases, the SOC 705 may be based on an ARM instruction set. In some cases, CPU 710 may be similar to processor 764. Parameters or variables (e.g., neural signals and synaptic weights), system parameters associated with a computational device (e.g., neural network with weights), delays, frequency bin information, task information, among other information may be stored in a memory block associated with a neural processing unit (NPU) 725, in a memory block associated with a CPU 710, in a memory block associated with a graphics processing unit (GPU) 715, in a memory block associated with a digital signal processor (DSP) 706, in a memory block 785, and/or may be distributed across multiple blocks. Instructions executed at the CPU 710 may be loaded from a program memory associated with the CPU 710 or may be loaded from a memory block 785.

The SOC 705 may also include additional processing blocks tailored to specific functions, such as a GPU 715, a DSP 706, a connectivity block 735, which may include fifth generation (5G) connectivity, fourth generation long term evolution (4G LTE) connectivity, Wi-Fi connectivity, USB connectivity, Bluetooth connectivity, and the like, and a multimedia processor 745 that may, for example, detect and recognize gestures. In one implementation, the NPU is implemented in the CPU 710, DSP 706, and/or GPU 715. The SOC 705 may also include a sensor processor 755, image signal processors (ISPs) 775, and/or navigation module 795, which may include a global positioning system. In some cases, the navigation module 795 may be similar to navigation components 756 and sensor processor 755 may accept input from, for example, one or more sensors 758. In some cases, the connectivity block 735 may be similar to the radio module 772.

Figure 8:
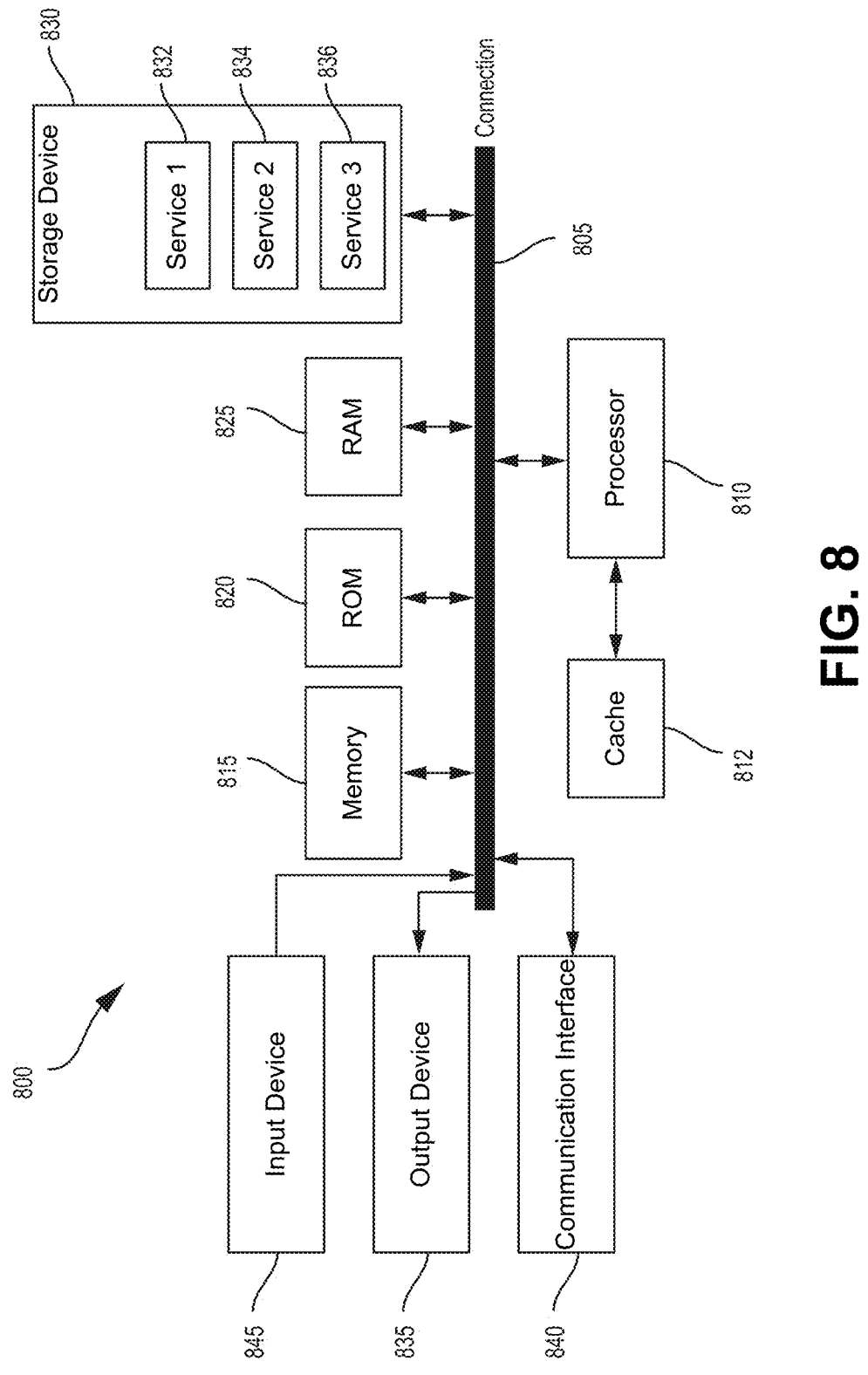
FIG. 8 is a diagram illustrating an example of a system for implementing certain aspects of the present technology.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example computing system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, camera, accelerometers, gyroscopes, etc. Computing system 800 can also include output device 835, which can be one or more of a number of output mechanisms. In some instances, multi-modal systems can enable a user to provide multiple types of input/output to communicate with computing system 800. Computing system 800 can include communications interface 840, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some examples, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the present disclosure include:

Aspect 1. An apparatus to demosaic one or more images, comprising: at least one memory configured to store image data; and at least one processor coupled to the at least one memory and configured to: perform a depth-wise convolution operation on the image data and a depth-wise convolutional filter with pre-determined parameter values to obtain a plurality of color channels for the image data; perform a convolution operation on the plurality of color channels to obtain a processed plurality of color channels; arrange the processed plurality of color channels into a demosaiced image; and output the demosaiced image.

Aspect 2. The apparatus of Aspect 1, wherein the image data is raw image data.

Aspect 3. The apparatus of Aspect 2, wherein the raw image data includes a Bayer pattern.

Aspect 4. The apparatus of any of Aspects 1-3, wherein the at least one processor is configured to perform the depth-wise convolution operation using at least one depth-wise convolutional filter including pre-determined parameter values.

Aspect 5. The apparatus of Aspect 4, wherein the pre-determined parameter values of the at least one depth-wise convolutional filter for the depth-wise convolution operation are pre-determined based on a color filter of an image sensor used to capture the image data.

Aspect 6. The apparatus of Aspect 5, wherein the color filter is based on a Bayer pattern, and wherein the at least one depth-wise convolutional filter includes a kernel size of 2×2 and a stride of 2.

Aspect 7. The apparatus of any of Aspects 4-6, wherein the pre-determined parameter values of the at least one depth-wise convolutional filter are determined to extract pixel color values from the image data.

Aspect 8. The apparatus of Aspect 7, wherein the pre-determined parameter values of the at least one depth-wise convolutional filter are set to 0 or 1.

Aspect 9. The apparatus of any of Aspects 1-8, wherein the at least one processor is configured to perform the convolution operation using a plurality of convolutional filters, wherein parameters of the plurality of convolutional filters are tuned based on a training process.

Aspect 10. The apparatus of Aspect 9, wherein a number of the plurality of convolutional filters is determined based on at least an upscaling factor.

Aspect 11. The apparatus of any of Aspects 1-10, wherein the at least one processor is configured to arrange the processed plurality of color channels into RGB channels based on a depth to space operation.

Aspect 12. The apparatus of Aspect 11, wherein, to perform the depth to space operation, the at least one processor is configured to spatially arrange data blocks of the processed plurality of color channels to generate the demosaiced image.

Aspect 13. The apparatus of any of Aspects 1-12, wherein the at least one processor is configured to up-sample the processed plurality of color channels based on a transpose convolution operation.

Aspect 14. The apparatus of any of Aspects 1-13, wherein the depth-wise convolution operation is performed by a machine learning model for image demosaicing.

Aspect 15. The apparatus of any of Aspects 1-14, wherein the at least one processor is further configured to execute the depth-wise convolution operation and the convolution operation on multiply and accumulate hardware units.

Aspect 16. The apparatus of Aspect 15, wherein the at least one processor comprises a neural processing unit, and wherein the neural processing unit includes the multiply and accumulate hardware units.

Aspect 17. The apparatus of Aspect 16, wherein the neural processing unit comprises an application specific integrated circuit (ASIC), and wherein the ASIC incorporates a machine learning model configured to perform the depth-wise convolution operation, the convolution operation, and arrange the processed plurality of color channels into the demosaiced image.

Aspect 18. The apparatus of Aspect 15, wherein the at least one processor comprises a graphics processing unit (GPU) or a central processing unit (CPU) that includes the multiply and accumulate hardware units, and wherein a machine learning model configured to perform the depth-wise convolution operation, the convolution operation, and arrange the processed plurality of color channels into the demosaiced image is executed on the GPU or CPU.

Aspect 19. The apparatus of any of Aspects 1-18, wherein the apparatus includes one or more image sensors.

Aspect 20. The apparatus of Aspect 19 wherein the at least one processor is integrated into the one or more image sensors.

Aspect 21. The apparatus of any of Aspects 19-20, wherein the one or more image sensors include one or more cameras.

Aspect 22. A method for image demosaicing, comprising: performing a depth-wise convolution operation on image data and a depth-wise convolutional filter with pre-determined parameter values to obtain a plurality of color channels for the image data; performing a convolution operation on the plurality of color channels to obtain a processed plurality of color channels; arranging the processed plurality of color channels into a demosaiced image; and outputting the demosaiced image.

Aspect 23. The method of Aspect 22, wherein the image data is raw image data.

Aspect 24. The method of Aspect 23, wherein the raw image data includes a Bayer pattern.

Aspect 25. The method of any of Aspects 22-24, wherein the depth-wise convolution operation is performed using at least one depth-wise convolutional filter including pre-determined parameter values.

Aspect 26. The method of Aspect 25, wherein the pre-determined parameter values of the at least one depth-wise convolutional filter for the depth-wise convolution operation are pre-determined based on a color filter of an image sensor used to capture the image data.

Aspect 27. The method of Aspect 26, wherein the color filter is based on a Bayer pattern, and wherein the at least one depth-wise convolutional filter includes a kernel size of 2×2 and a stride of 2.

Aspect 28. The method of any of Aspects 25-27, wherein the pre-determined parameter values of the at least one depth-wise convolutional filter are determined to extract pixel color values from the image data.

Aspect 29. The method of Aspect 28, wherein the pre-determined parameter values of the at least one depth-wise convolutional filter are set to 0 or 1.

Aspect 30. The method of any of Aspects 22-29, wherein the convolution operation is performed using a plurality of convolutional filters, wherein parameters of the plurality of convolutional filters are tuned based on a training process.

Aspect 31. The method of Aspect 30, wherein a number of the plurality of convolutional filters is determined based on at least an upscaling factor.

Aspect 32. The method of any of Aspects 22-31, wherein the processed plurality of color channels are arranged into RGB channels by performing a depth to space operation.

Aspect 33. The method of Aspect 32, wherein the depth to space operation includes spatially arranging data blocks of the processed plurality of color channels to generate the demosaiced image.

Aspect 34. The method of any of Aspects 22-33, wherein the processed plurality of color channels are up-sampled by performing a transpose convolution operation.

Aspect 35. The method of any of Aspects 22-34, further comprising executing the depth-wise convolution operation and the convolution operation on multiply and accumulate hardware units.

Aspect 36. A non-transitory computer-readable medium having stored thereon instructions that, when executed by at least one processor, cause the at least one processor to: perform a depth-wise convolution operation on image data and a depth-wise convolutional filter with pre-determined parameter values to obtain a plurality of color channels for the image data; perform a convolution operation on the plurality of color channels to obtain a processed plurality of color channels; and arrange the processed plurality of color channels into a demosaiced image; and output the demosaiced image.

Aspect 37. The non-transitory computer-readable medium of Aspect 36, wherein the instructions cause the at least one processor to perform one or more operations according to any of Aspects 22-35.

Aspect 38: An apparatus for image demosaicing, comprising means for performing one or more of operations according to any of Aspects 22 to 35.

What is claimed is:

1. An apparatus to demosaic one or more images, comprising:
  at least one memory configured to store image data; and
  at least one processor coupled to the at least one memory and configured to:
    perform a depth-wise convolution operation on the image data and a depth-wise convolutional filter, of a plurality of depth-wise convolutional filters, with pre-determined filter values to obtain a plurality of color channels for the image data, wherein each depth-wise convolutional filter of the plurality of depth-wise convolutional filters corresponds to a color channel;
    perform a convolution operation on the plurality of color channels to obtain a processed plurality of color channels;
    arrange the processed plurality of color channels into a demosaiced image; and
    output the demosaiced image.

2. The apparatus of claim 1, wherein the image data is raw image data.

3. The apparatus of claim 2, wherein the raw image data includes a Bayer pattern.

4. The apparatus of claim 1, wherein the at least one processor is configured to perform the depth-wise convolution operation using at least one depth-wise convolutional filter including pre-determined parameter values.

5. The apparatus of claim 4, wherein the pre-determined parameter values of the at least one depth-wise convolutional filter for the depth-wise convolution operation are pre-determined based on a color filter of an image sensor used to capture the image data.

6. The apparatus of claim 5, wherein the color filter is based on a Bayer pattern, and wherein the at least one depth-wise convolutional filter includes a kernel size of 2×2 and a stride of 2.

7. The apparatus of claim 4, wherein the pre-determined parameter values of the at least one depth-wise convolutional filter are determined to extract pixel color values from the image data.

8. The apparatus of claim 7, wherein the pre-determined parameter values of the at least one depth-wise convolutional filter are set to 0 or 1.

9. The apparatus of claim 1, wherein the at least one processor is configured to perform the convolution operation using a plurality of convolutional filters, wherein parameters of the plurality of convolutional filters are tuned based on a training process.

10. The apparatus of claim 9, wherein a number of the plurality of convolutional filters is determined based on at least an upscaling factor.

11. The apparatus of claim 1, wherein the at least one processor is configured to arrange the processed plurality of color channels into RGB channels based on a depth to space operation.

12. The apparatus of claim 11, wherein, to perform the depth to space operation, the at least one processor is configured to spatially arrange data blocks of the processed plurality of color channels to generate the demosaiced image.

13. The apparatus of claim 1, wherein the at least one processor is configured to up-sample the processed plurality of color channels based on a transpose convolution operation.

14. The apparatus of claim 1, wherein the at least one processor is configured to perform the depth-wise convolution operation using a machine learning model configured to perform image demosaicing.

15. The apparatus of claim 1, wherein the at least one processor is further configured to execute the depth-wise convolution operation and the convolution operation on multiply and accumulate hardware units.

16. The apparatus of claim 15, wherein the at least one processor comprises a neural processing unit, and wherein the neural processing unit includes the multiply and accumulate hardware units.

17. The apparatus of claim 16, wherein the neural processing unit comprises an application specific integrated circuit (ASIC), and wherein the ASIC incorporates a machine learning model configured to perform the depth-wise convolution operation, the convolution operation, and arrange the processed plurality of color channels into the demosaiced image.

18. The apparatus of claim 15, wherein the at least one processor comprises a graphics processing unit (GPU) or a central processing unit (CPU) that includes the multiply and accumulate hardware units, and wherein a machine learning model configured to perform the depth-wise convolution operation, the convolution operation, and arrange the processed plurality of color channels into the demosaiced image is executed on the GPU or CPU.

19. The apparatus of claim 1, wherein the apparatus includes one or more image sensors.

20. The apparatus of claim 19 wherein the at least one processor is integrated into the one or more image sensors.

21. The apparatus of claim 19, wherein the one or more image sensors include one or more cameras.

22. A method for image demosaicing, comprising:

performing a depth-wise convolution operation on image data and a depth-wise convolutional filter with pre-determined filter values to obtain a plurality of color channels for the image data, wherein the convolutional filter corresponds to a color channel;

performing a convolution operation on the plurality of color channels to obtain a processed plurality of color channels;

arranging the processed plurality of color channels into a demosaiced image; and outputting the demosaiced image.

23. The method of claim 22, wherein the image data is raw image data.

24. The method of claim 22, wherein the depth-wise convolution operation is performed using at least one depth-wise convolutional filter including pre-determined parameter values.

25. The method of claim 24, wherein the pre-determined parameter values of the at least one depth-wise convolutional filter for the depth-wise convolution operation are pre-determined based on a color filter of an image sensor used to capture the image data.

26. The method of claim 24, wherein the pre-determined parameter values of the at least one depth-wise convolutional filter are determined to extract pixel color values from the image data.

27. The method of claim 22, wherein the convolution operation is performed using a plurality of convolutional filters, wherein parameters of the plurality of convolutional filters are tuned based on a training process.

28. The method of claim 22, wherein the processed plurality of color channels are arranged into RGB channels by performing a depth to space operation.

29. The method of claim 22, further comprising executing the depth-wise convolution operation and the convolution operation on multiply and accumulate hardware units.

30. A non-transitory computer-readable medium having stored thereon instructions that, when executed by at least one processor, cause the at least one processor to:

perform a depth-wise convolution operation on image data and a depth-wise convolutional filter with pre-determined filter values to obtain a plurality of color channels for the image data, wherein the convolutional filter corresponds to a color channel;

perform a convolution operation on the plurality of color channels to obtain a processed plurality of color channels; and arrange the processed plurality of color channels into a demosaiced image; and output the demosaiced image.

\* \* \* \* \*